(12) United States Patent
Matsunaga

(10) Patent No.: US 10,745,008 B2
(45) Date of Patent: Aug. 18, 2020

(54) DRIVING SUPPORT DEVICE AND DRIVING SUPPORT METHOD

(71) Applicant: DENSO CORPORATION, Kariya, Aichi-pref. (JP)

(72) Inventor: Shogo Matsunaga, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 203 days.

(21) Appl. No.: 16/065,516

(22) PCT Filed: Dec. 23, 2016

(86) PCT No.: PCT/JP2016/088595
§ 371 (c)(1),
(2) Date: Jun. 22, 2018

(87) PCT Pub. No.: WO2017/111147
PCT Pub. Date: Jun. 29, 2017

(65) Prior Publication Data
US 2018/0370529 A1 Dec. 27, 2018

(30) Foreign Application Priority Data
Dec. 25, 2015 (JP) .................................. 2015-254443

(51) Int. Cl.
*B60W 30/00* (2006.01)
*B60W 30/09* (2012.01)
(Continued)

(52) U.S. Cl.
CPC ............ *B60W 30/09* (2013.01); *B60W 10/18* (2013.01); *B60W 10/20* (2013.01); *B60W 50/14* (2013.01);
(Continued)

(58) Field of Classification Search
USPC ................... 701/23–28, 48, 70–97, 300–302
See application file for complete search history.

(56) References Cited

U.S. PATENT DOCUMENTS 5,936,549 A * 8/1999 Tsuchiya ................... G01P 3/42
340/903
6,192,309 B1 * 2/2001 Prestl ................. B60K 31/0008
180/170
(Continued)

FOREIGN PATENT DOCUMENTS

JP H05-242396 A 9/1993
JP 2012-048460 A 3/2012
(Continued)

*Primary Examiner* — Jonathan L Sample
(74) *Attorney, Agent, or Firm* — Maschoff Brennan

(57) ABSTRACT

A driving support device is mounted to a vehicle. The driving support device includes an object detection unit that detects an object moving in a direction crossing the traveling direction of the vehicle, a collision prediction unit, a support execution unit, an acceleration calculation unit, and a prohibition unit. The collision prediction unit predicts a collision between the object detected by the object detection unit and the vehicle. When the collision prediction unit predicts a collision between the object and the vehicle, the support execution unit performs driving support for reducing the risk of a collision of the vehicle. The acceleration calculation unit calculates the acceleration of the object. When the calculated acceleration has become more negative than a negative threshold, the prohibition unit prohibits the support execution unit from performing the driving support with respect to the object.

15 Claims, 5 Drawing Sheets

(51) Int. Cl.
  *G08G 1/16* (2006.01)
  *B60W 10/18* (2012.01)
  *B60W 10/20* (2006.01)
  *B60W 50/14* (2020.01)

(52) U.S. Cl.
  CPC .............. *G08G 1/16* (2013.01); *G08G 1/166* (2013.01); *B60W 2554/00* (2020.02)

(56) References Cited

U.S. PATENT DOCUMENTS

| | | | |
|---|---|---|---|
| 9,896,073 B2* | 2/2018 | Spencer | B60T 8/17558 |
| 10,529,237 B2* | 1/2020 | Kamijo | G08G 1/166 |
| 2010/0082195 A1* | 4/2010 | Lee | B62D 15/025 |
| | | | 701/25 |
| 2011/0019873 A1* | 1/2011 | Yamato | G06K 9/00805 |
| | | | 382/103 |
| 2012/0265418 A1* | 10/2012 | Foerster | B60W 30/09 |
| | | | 701/70 |
| 2014/0333467 A1* | 11/2014 | Inomata | G01S 7/411 |
| | | | 342/27 |
| 2015/0307093 A1* | 10/2015 | Sasabuchi | B60W 10/18 |
| | | | 701/1 |
| 2016/0061172 A1* | 3/2016 | Sato | B60W 40/04 |
| | | | 701/112 |
| 2018/0370529 A1* | 12/2018 | Matsunaga | B60W 50/14 |

FOREIGN PATENT DOCUMENTS

| | | |
|---|---|---|
| JP | 2013-145205 A | 7/2013 |
| JP | 2014-194182 A | 10/2014 |
| JP | 2015-032028 A | 2/2015 |
| JP | 2015-049583 A | 2/2015 |
| JP | 2015-210572 A | 11/2015 |
| JP | 2017-117344 A | 6/2017 |
| WO | 2009/099022 A1 | 8/2009 |

* cited by examiner

DRIVING SUPPORT DEVICE AND DRIVING SUPPORT METHOD

CROSS-REFERENCE TO RELATED APPLICATION

This patent application is based on Japanese Patent Application No. 2015-254443, filed on Dec. 25, 2015, in the Japan Patent Office, the entire disclosure of which is incorporated herein by reference.

BACKGROUND

Technical Field

The present disclosure relates to a driving support device that is mounted to a vehicle to detect an object ahead of the vehicle and cause the vehicle to perform driving support, and a driving support method.

Background Art

In recent years, with the advancement of sensors and data processing, vehicles have been equipped with a driving support device to avoid collision accidents caused by the entry of an object from the lateral direction into the traveling direction of the vehicle. For example, PTL 1 describes a driving support device that increases a detection area to detect an object when the lateral movement speed of the object approaching the vehicle from lateral direction with respect to the traveling direction of the vehicle is equal to or higher than a predetermined speed and when the distance between the object and the vehicle is equal to or shorter than a predetermined distance. The detection area is within a range in which both a camera and a radar can detect the object, which makes it possible to detect the laterally moving object with high accuracy.

CITATION LIST

Patent Literature

[PTL 1] JP 2012-48460 A

As described above, the driving support device described in PTL 1 increases the detection area according to the distance and speed of an object when the object is laterally approaching to the traveling direction of the vehicle, to thereby detect the object laterally approaching the moving direction of the vehicle. However, when an object decelerates while moving laterally toward the course of the vehicle and moves out the collision area (hereinafter, called near-collision avoidance behavior), the detection of the lateral movement speed of the object may be delayed. This may cause unnecessary driving support, such as alarm generation or automatic braking.

SUMMARY

A major objective of the present disclosure is to provide a driving support device and a driving support method that can prevent unnecessary driving support, even when an object decelerates while moving laterally toward the course of the vehicle and moves out the collision area.

A first aspect of the present disclosure is a driving support device including: an object detection unit that detects an object moving in a direction crossing the traveling direction of a vehicle; a collision prediction unit that predicts a collision between the object, detected by the object detection unit, and the vehicle; a support execution unit that, when the collision prediction unit predicts a collision between the object and the vehicle, performs driving support for reducing the risk of a collision of the vehicle; an acceleration calculation unit that calculates the acceleration of the object; and a prohibition unit that, when the acceleration calculated by the acceleration calculation unit has become more negative than a negative threshold, prohibits the support execution unit from performing the driving support related to the object.

When the acceleration calculated by the acceleration calculation unit has become more negative than the negative threshold, it is assumed that the object has decelerated beyond the normal level and that the probability of a collision between the vehicle and the object has decreased. Accordingly, unnecessary driving support can be prevented by allowing the prohibition unit to prohibit the driving support. If the determination of whether to perform prohibition control by the prohibition unit is made based on the speed of the object, the threshold of the speed will be set to a value at which it can be determinable when the object has stopped. Accordingly, it takes time before the prohibition control is performed by the prohibition unit. However, if the determination is made based on the acceleration, a rarely occurring sudden deceleration can be instantaneously grasped, which makes it possible to execute earlier the prohibition control by the prohibition unit.

BRIEF DESCRIPTION OF THE DRAWINGS

The above and other objects, features, and advantageous effects of the present disclosure will become clearer from the following detailed description with reference to the accompanying drawings. In the drawings.

DESCRIPTION OF EMBODIMENTS

The driving support device according to the present embodiment is mounted to a vehicle (the own vehicle) to detect an object around the own vehicle (hereinafter referred to as target), such as ahead of the own vehicle in the traveling direction, and perform driving support control. The driving support control serves as a pre-crash safety system (PCS system) to avoid a collision with a target or reduce collision damage.

Figure 1:
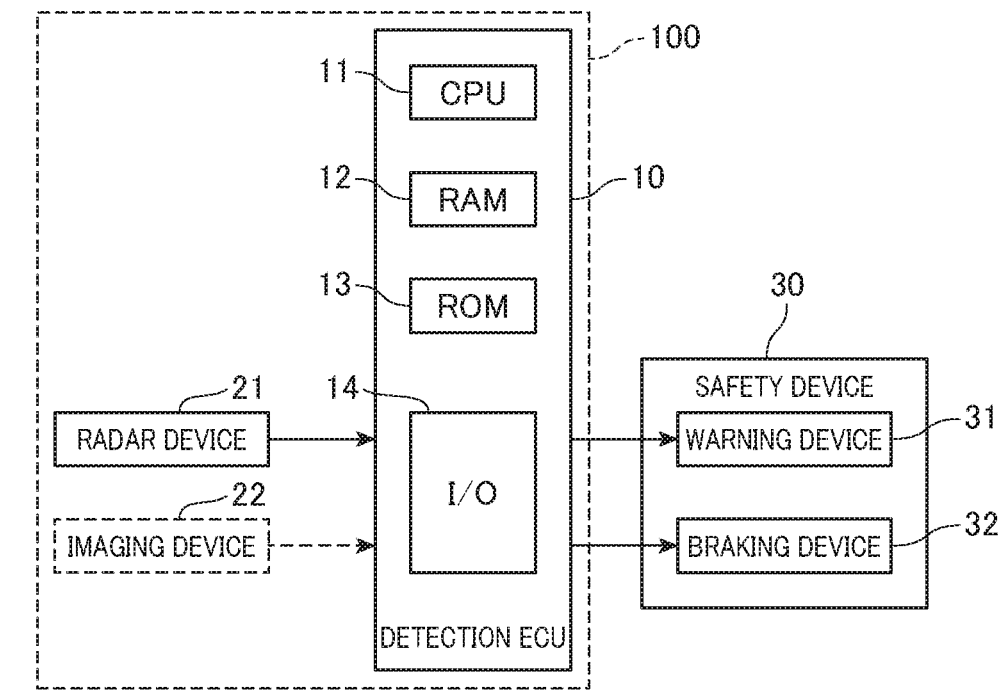
FIG. 1 is a set of block diagrams, in which (a) part thereof illustrates a block diagram of a hardware of a driving support device, and (b) part thereof illustrates a functional block diagram of a detection ECU according to the present embodiment.
Figure 1:
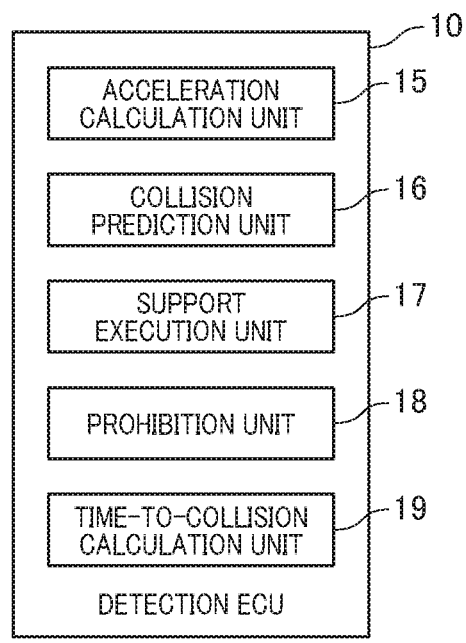

As shown in FIG. 1(a), a driving support device 100 includes a detection ECU (electronic control unit) 10 and a radar device 21.

The radar device 21 is a known millimeter wave radar, for example, that uses a high frequency signal in the millimeter waveband as transmission waves. The radar device 21 is disposed at the front end part of the own vehicle to detect the position of a target in an area at a predetermined detection angle as target-detectable range. Specifically, the radar device 21 transmits search waves at predetermined intervals and receives reflected waves with a plurality of antennas. The radar device 21 calculates the distance to the target, from the transmission time of search waves and the reception time of reflected waves. The radar device 21 also calculates information on the relative speed of the target, based on the frequencies of the reflected waves from the target, varied due to Doppler Effect. Accordingly, the radar device 21 functionally corresponds to the speed calculation unit. In addition, the radar device 21 calculates the azimuth of the target from phase differences in the reflected waves received by the plurality of antennas. When the position and azimuth of the target can be calculated, the position of the target relative to the own vehicle (lateral position) can be specified. Accordingly, the radar device 21 corresponds to an object detection unit that detects a target moving in a direction crossing the traveling direction of the own vehicle. The radar device 21 transmits search waves, receives reflected waves, calculates the reflection position and the relative speed at predetermined intervals, and transmits the calculated reflection positions and relative speed to the detection ECU 10.

The radar device 21 is connected to the detection ECU 10. The detection ECU 10 is a computer including a central processing unit (CPU) 11, a random access memory (RAM) 12, a read only memory (ROM) 13, and an input/output (I/O) 14, and others. The detection ECU 10 realizes these functions by causing the CPU 11 to execute a program installed in the ROM 13. In the present embodiment, the program installed in the ROM 13 is a control program to detect a target ahead of the own vehicle and perform a prescribed driving support process based on the information about the target detected by the radar device 21 (the calculated position, relative speed, and others). The ROM 13 corresponds to the non-transitory computer readable recording medium. Besides the ROM 13, the recording medium includes computer-readable electronic media such as digital versatile disk read only memory (DVD-ROM), a compact disc read only memory (CD-ROM), and a hard disk. As illustrated in FIG. 1(b), the detection ECU 10 performs various functions using an acceleration calculation unit 15, a collision prediction unit 16, a support execution unit 17, a prohibition unit 18, and a time-to-collision calculation unit 19.

In the present embodiment, the driving support process corresponds to a warning process of notifying the driver of a target ahead of the own vehicle, and a braking process of applying brakes to the own vehicle. Accordingly, the own vehicle is equipped with a warning device 31 and a braking device 32 as a safety device 30 that is driven by a control command from the detection ECU 10.

The warning device 31 includes a speaker and a display mounted to the interior of the own vehicle. When the detection ECU 10 determines that the distance between the own vehicle and the target has become shorter than a first predetermined distance and the probability of a collision of the own vehicle with the target has become high, the warning device 31 outputs a warning sound, a warning message, or the like according to a control command from the detection ECU 10 to notify the driver of the risk of a collision. Therefore, the warning device 31 corresponds to a notification unit that notifies the driver of the approach of the target.

The braking device 32 applies brakes to the own vehicle. When the detection ECU 10 determines that the distance between the own vehicle and the target has become shorter than a second predetermined distance which is set to be shorter than the first predetermined distance, and the probability of a collision of the own vehicle with the target has become high, the braking device 32 is activated according to a control command from the detection ECU 10. Specifically, the braking device 32 enhances braking force generated by the driver's brake operation (brake assist function) or automatically applies brakes if the driver does not perform brake operation (automatic braking function). Therefore, the braking device 32 corresponds to the automatic braking unit that applies automatic braking to the own vehicle.

Figure 2:
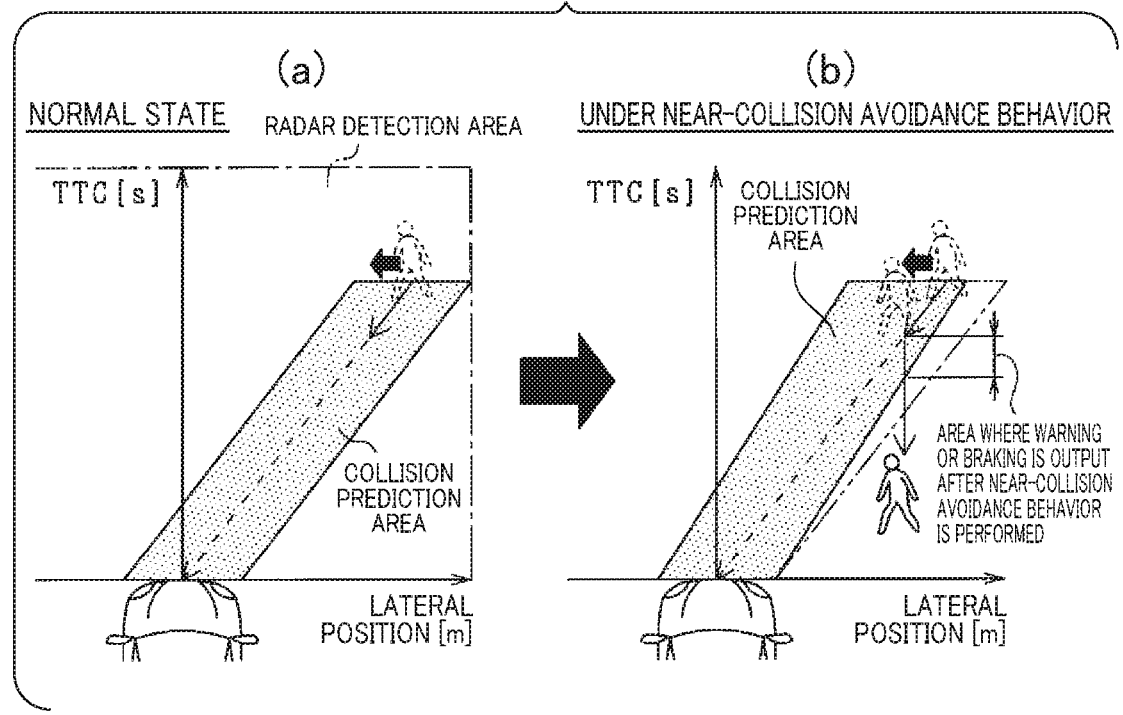
FIG. 2, in its (a) and 2(b) parts, shows diagrams illustrating problems that may occur in a conventional driving support device when a target performs a near-collision avoidance behavior.

The time-to-collision calculation unit 19 of the detection ECU 10 calculates a time-to-collision (TTC) that is a time before the own vehicle collides with the target detected by the radar device 21. Specifically, the time-to-collision calculation unit 19 calculates a time-to-collision based on the distance and the relative speed between the own vehicle and the target. As illustrated in FIG. 2(a), the time-to-collision calculation unit 19 establishes a radar detection area in a plane. In the plane, the longitudinal axis defines the time-to-collision (TTC) and the lateral axis defines the lateral position of the target with respect to the own vehicle in the lateral direction orthogonal to the traveling direction of the own vehicle. However, all targets in the radar detection area do not always have a risk of colliding with the own vehicle. Therefore, the collision prediction unit 16 recognizes a target, in a collision prediction area set to further limit the radar detection area, as a target that may collide with the own vehicle. The lateral position of the collision prediction area is set based on the speed of the target in the radar detection area and the time-to-collision. Specifically, the lateral position of the collision prediction area is calculated by Equation (1). The width of the collision prediction area in the lateral axis direction is set based on the width of the own vehicle. That is, the collision prediction unit 16 establishes the collision prediction area in a plane. In the plane, the lateral position axis defines the position of the target with respect to the own vehicle and the predicted time axis defines the time-to-collision. Then, the collision prediction unit 16 predicts a collision with the target depending on whether the target is present in the collision prediction area in the plane. Therefore, the collision prediction unit 16 predicts a collision between the own vehicle and the target detected by the radar device 21.

$$\text{Lateral position} = \text{the speed of the target} \times \text{TTC} \tag{1}$$

Let us assume a situation that, as shown in FIG. 2(b), the target has moved out the collision prediction area (hereinafter, called near-collision avoidance behavior as necessary) due to deceleration while moving laterally toward the course of the vehicle. In this case, a conventional detection ECU 10 may be slow in recognizing a near-collision avoidance behavior of the target, and thus there may be delays, accordingly, in resetting the collision prediction area. Therefore, the target should be in the collision prediction area for a time corresponding to the delay in resetting the collision prediction area, even though there is no probability of the target colliding with the own vehicle. In this case, the warning device 31 or the braking device 32 may be unnecessarily activated depending on the distance between the own vehicle and the target.

Figure 3:
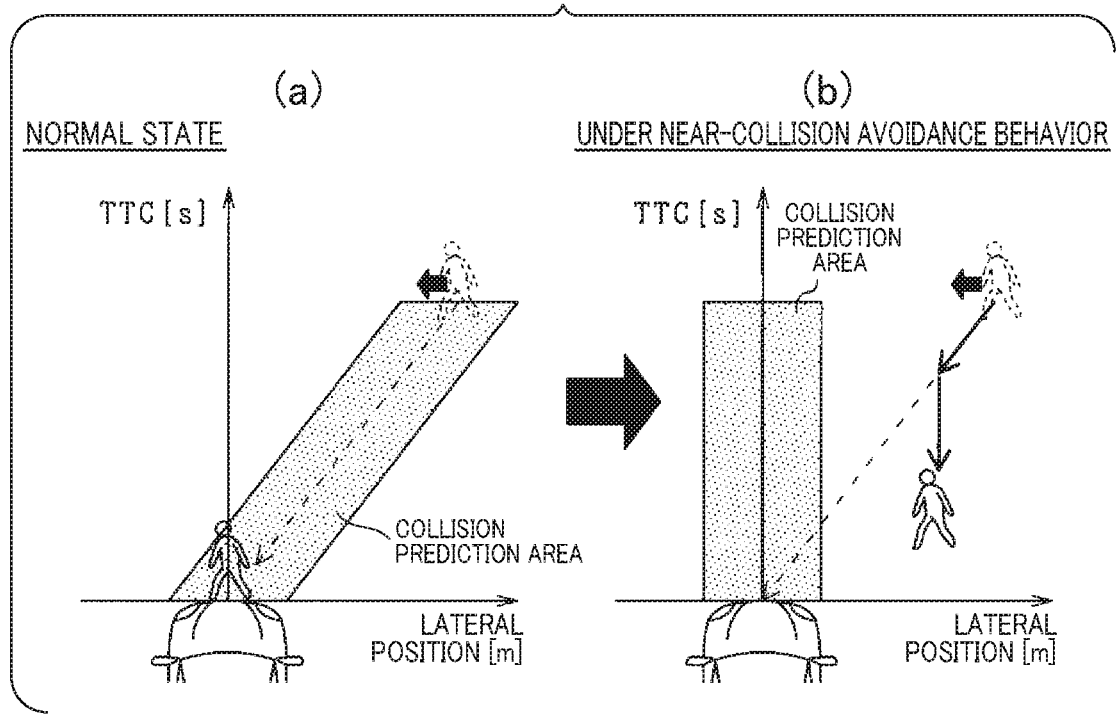
FIG. 3, in its (a) and 3(b) parts, shows diagrams illustrating a control performed by the driving support device according to the present embodiment when a target performs near-collision avoidance behavior.

Therefore, the collision prediction unit 16 of the detection ECU 10 according to the present embodiment determines that the target has performed the near-collision behavior in the collision prediction area. In this regard, the target that has performed the near-collision avoidance behavior is less likely to collide with the own vehicle. However, if another target is present ahead of the own vehicle, the warning device 31 or the braking device 32 needs to be activated depending on the distance to that target. Accordingly, when it is determined that the target has performed the near-collision avoidance behavior from the normal state illustrated in FIG. 3(*a*), the collision prediction unit 16 sets the collision prediction area ahead of the own vehicle as illustrated in FIG. 3(*b*). This makes it possible to prevent unnecessary activation of the warning device 31 or the braking device 32 for the target having performed the near-collision avoidance behavior.

Figure 4:
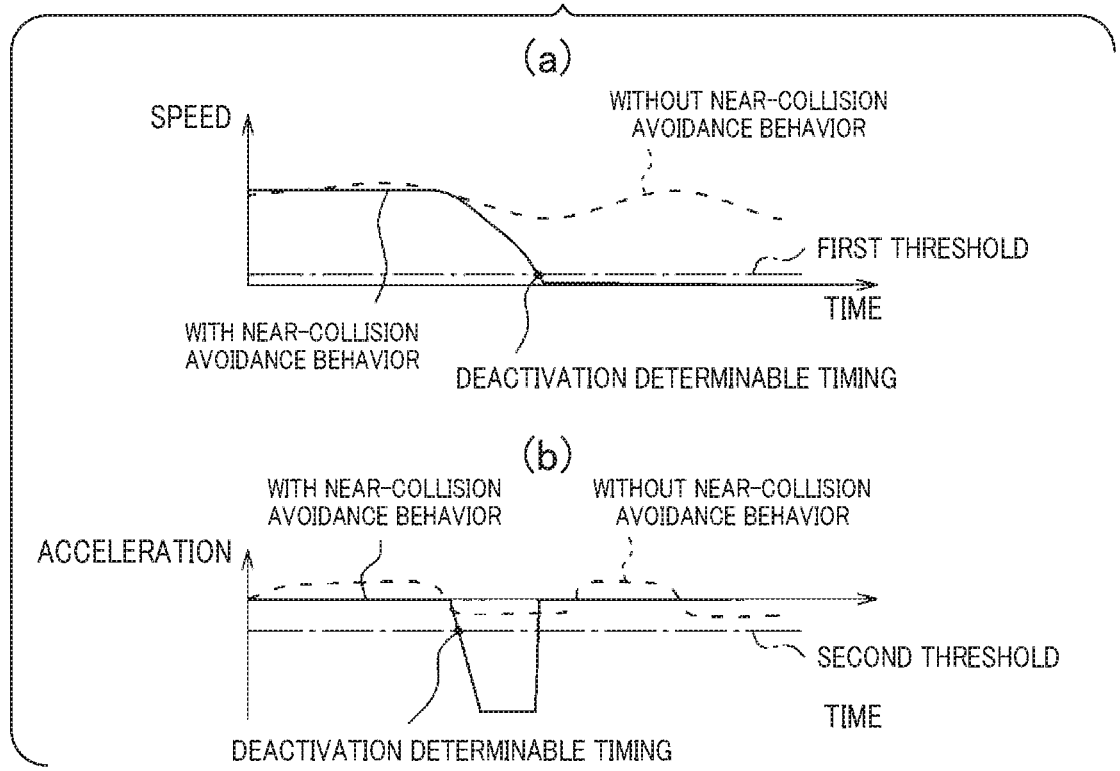
FIG. 4, in its (a) and 4(b) parts, shows graphs illustrating a determination of the near-collision avoidance behavior of a target based on the speed or acceleration of the target.

In the present embodiment, the near-collision avoidance behavior determination is made based on not the speed of the target but the acceleration of the target. If the near-collision avoidance behavior determination is made based on the speed of the target, a first threshold for determining whether the target has performed the near-collision avoidance behavior is set to a value close to the speed at which the target stops, as illustrated in FIG. 4(*a*). Accordingly, it takes time from the near-collision avoidance behavior of the target to the determination of the near-collision avoidance behavior by the detection ECU 10.

In the case of making the near-collision avoidance behavior determination based on the acceleration of the target, it can be determined that the target has performed the near-collision avoidance behavior because the target is recognized to have decelerated to a degree that is unusual in normal driving. This allows the near-collision avoidance behavior determination to be made faster as compared to the case of making the determination based on the speed of the target. When the target is a pedestrian, for example, it is presumed that the walking speed of the target will vary as illustrated in FIG. 4(*a*). In this case, the acceleration of the target will also vary as illustrated in FIG. 4(*b*). Accordingly, the acceleration may fluctuate and fall under a negative second threshold (corresponding to the negative threshold) depending on its setting value of the negative second threshold. Therefore, in the present embodiment, based on the assumption that the target is a pedestrian who is walking in a steady state, the second negative threshold is set to be more negative than the minimum value of the varying acceleration.

Figure 5:
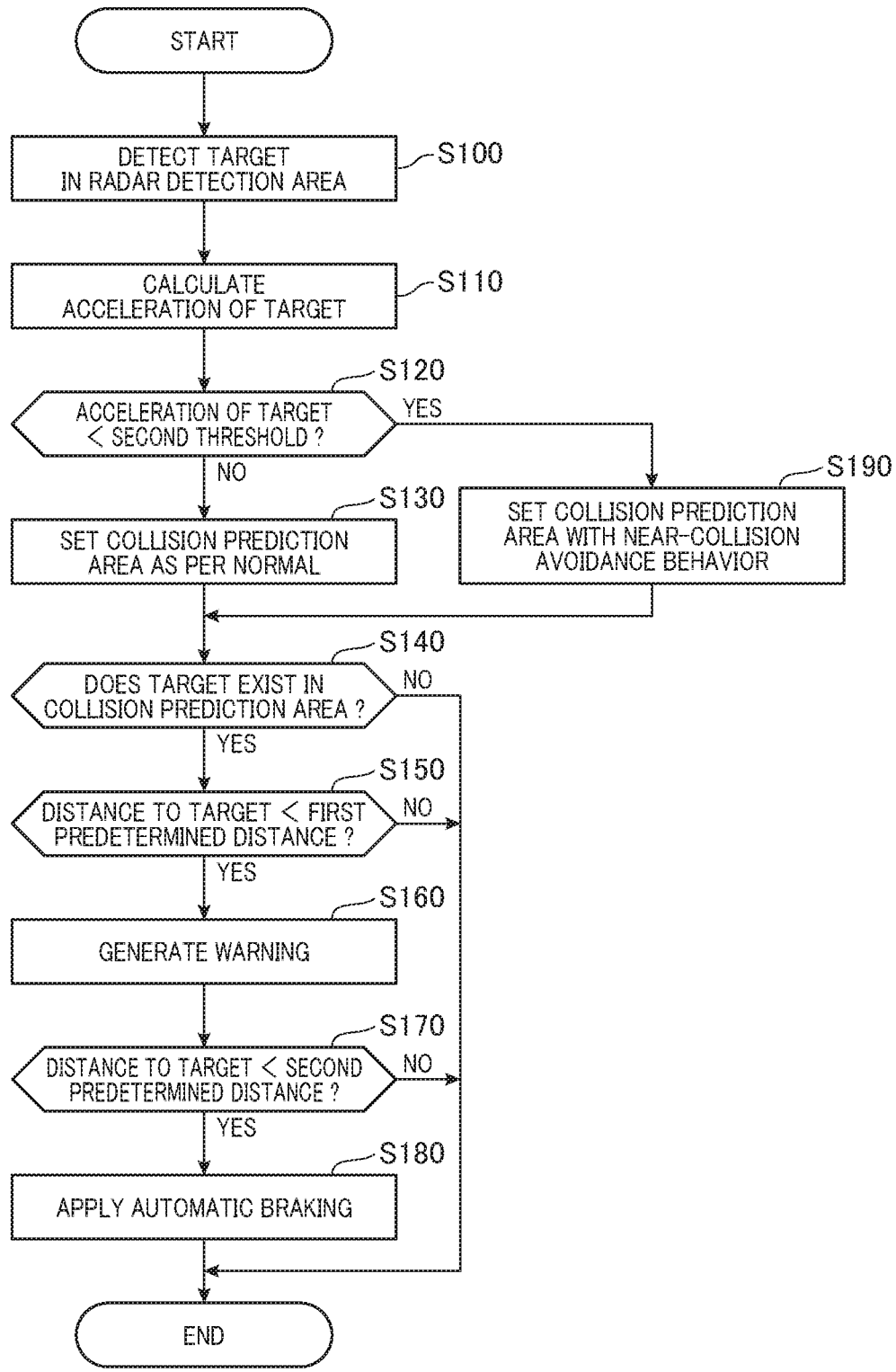
FIG. 5 is a flowchart of control performed by the driving support device according to the present embodiment.

In the present embodiment, the support execution unit 17 of the driving support device 100 performs the driving support control described later with reference to FIG. 5. When the collision prediction unit 16 predicts a collision between the target and the own vehicle, the support execution unit 17 performs driving support for reducing the risk of a collision. The detection ECU 10 cyclically performs the driving support control described in FIG. 5 while the power supply for the detection ECU 10 is on.

First, in step S100, the radar device 21 causes the radar device 21 to detect a target in the radar detection area. Then, the radar device 21 calculates the reflection position and the relative speed of the target, and transmits the calculated information. In step S110, based on the information transmitted by the radar device 21, the acceleration calculation unit 15 calculates the speed of the target laterally approaching toward the course of the own vehicle. Then, the acceleration calculation unit 15 subjects the calculated lateral speed to time differentiation to determine the lateral acceleration of the target.

In step S120, the detection ECU 10 determines whether the acceleration calculated by the acceleration calculation unit 15 has become more negative than the second negative threshold. The determination corresponds to the near-collision avoidance behavior determination. If it is determined that the calculated acceleration is not negative than the second negative threshold (NO in S120), control proceeds to step S130. In step S13, the collision prediction area is set as per normal based on the speed of the target in the radar detection area and the time-to-collision, and then control proceeds to step S140. If it is determined that the calculated acceleration has become more negative than the second negative threshold (YES in S120), control proceeds to step S190. In step S190, the collision prediction area is reset to the area ahead of the own vehicle, and then control proceeds to step S140.

In step S140, the detection ECU 10 determines whether the target is present in the collision prediction area set in step S130 or S190. If it is determined that the target is not present in the collision prediction area (NO in S140), the detection ECU 10 terminates the control. If the collision prediction unit 16 determines that the target is present in the collision prediction area (YES in S140), control proceeds to step S150.

In step S150, the detection ECU 10 determines whether the distance between the target in the collision prediction area and the own vehicle has become shorter than the first predetermined distance. If it is determined that the distance between the target present in the collision prediction area and the own vehicle is not shorter than the first predetermined distance (NO in S150), the detection ECU 10 terminates the control. If it is determined that the distance between the target in the collision prediction area and the own vehicle has become shorter than the first predetermined distance (YES in S150), control proceeds to step S160.

In step S160, the support execution unit 17 causes the warning device 31 to warn the driver about the approach of the target in the collision prediction area toward the own vehicle, and then control proceeds to step S170. In step S170, the detection ECU 10 determines whether the distance between the target in the collision prediction area and the own vehicle has become shorter than the second predetermined distance. This assumes that the target continues to approach toward the own vehicle despite the warning from the warning device 31 to the driver. If it is determined that the distance between the target in the collision prediction area and the own vehicle is not shorter than the second predetermined distance (NO in S170), the detection ECU 10 terminates the control. If it is determined that the distance between the target in the collision prediction area and the own vehicle has become shorter than the second predetermined distance (YES in S170), control proceeds to step S180 to cause the braking device 32 to apply automatic braking, and then terminates the control.

When the target moves out the collision prediction area during the period when the warning device 31 issues a warning in step S160 or during the period when the braking device 32 applies automatic braking in step S180, the detection ECU 10 stops the current step S160 or S180 immediately.

According to the aforementioned configuration, the present embodiment provides the advantageous effects described below.

When the acceleration of the target in the collision prediction area has become more negative than the second negative threshold, it is estimated that the target has decelerated beyond the normal level and has performed the near-collision avoidance behavior. In this case, resetting the collision prediction area to the area ahead of the own vehicle allows the target to move out the collision prediction area. Accordingly, the prohibition unit 18 of the detection ECU 10 cannot instruct the warning device 31 and the braking device 32 to perform control. Accordingly, unnecessary control by the warning device 31 and the braking device 32 can be prevented. In addition, by making the near-collision avoidance behavior determination based on the acceleration, the occurrence of a sudden deceleration which would be unlikely under normal conditions can be grasped, at a relatively early stage. Due to this, the collision prediction area can be reset even faster.

In the present embodiment, based on the assumption that the target detected by the radar device 21 is a pedestrian who is walking in a steady state, the second negative threshold for use in the near-collision avoidance behavior determination is set to be more negative than the minimum value of the varying acceleration. Even when a pedestrian has not stopped walking, the walking speed may vary, which may lead to an erroneous determination that the pedestrian has performed the near-collision avoidance behavior. With the configuration set forth above, such an erroneous determination can be prevented.

The width of the collision prediction area along the lateral position axis is set based on the width of the own vehicle. Accordingly, a target at a position beyond the width along the lateral position axis should be outside the width of the own vehicle. Therefore, it is determined that a collision with the own vehicle is less likely to occur. In addition, setting the lateral position based on the speed of the target and the time-to-collision can accurately determine whether the target moving at the speed is likely to collide with the own vehicle.

When it is determined that the target in the collision prediction area has performed the near-collision avoidance behavior, the collision prediction area is reset to the area ahead of the own vehicle only based on the width of the own vehicle. This makes it possible to prevent the warning device 31 or the braking device 32 from being activated for the target that is present ahead of the vehicle in the lateral direction and has performed the near-collision avoidance behavior. In addition, the target ahead of the own vehicle can also be detected.

Despite the notification of the approach of the target by the warning device 31 to the driver, when the distance between the target and the own vehicle has become shorter than the second predetermined distance and the probability of a collision has become higher than before the notification, the braking device 32 applies automatic braking. This prevents a collision between the own vehicle and the target.

When the target moves out the collision prediction area during the warning process of the warning device 31 or the automatic braking process of the braking device 32, the current process is stopped immediately. Accordingly, the execution period of the warning process by the warning device 31 or the automatic braking process by the braking device 32 can be minimized.

The aforementioned embodiment can be modified as described below.

In the aforementioned embodiment, the means for reducing the risk of a collision with a target in the collision prediction area is applied depending on the distance between the own vehicle and the target. Specifically, the warning device 31 is activated when the distance between the own vehicle and the target in the collision prediction area is shorter than the first predetermined distance. The braking device 32 is activated when the distance between the own vehicle and the target in the collision prediction area is shorter than the second predetermined distance. In this regard, the means for reducing the risk of a collision with a target is not limited to the warning device 31 and the braking device 32. For example, instead of the braking device 32 performing the automatic braking control, a steering wheel control unit may be provided to automatically control a steering wheel to avoid a collision with a target in the collision prediction area when the distance between the own vehicle and the target is determined to be shorter than a third predetermined distance.

In the aforementioned embodiment, the radar device 21 detects a target moving in the direction crossing the traveling direction of the own vehicle. In this regard, the radar device 21 does not necessarily have to detect a target but an imaging device 22, for example, may detect a target moving in the direction crossing the traveling direction of the own vehicle. The imaging device 22 includes, for example, a charged-coupled device (CCD) camera, a complementary metal-oxide semiconductor (CMOS) image sensor, a monocular camera or a stereo camera using a near-infrared camera. In this case as well, the position information and relative speed of the target can be calculated based on the image captured by the imaging device 22. Accordingly, this configuration provides the same advantageous effects as those of the aforementioned embodiment. Therefore, the imaging device 22 corresponds to an example of the object detection unit.

In the aforementioned embodiment, the target is assumed to be a pedestrian. In this regard, the target is not limited to a pedestrian but may be a bicycle, a motorcycle, or an automobile, for example. In this case, it is presumed that the acceleration of the target will vary differently depending on whether the target is a bicycle, a motorcycle, or an automobile. Accordingly, the second negative threshold is set to a different value depending on the target. In another example, the type of the target is determined based on the image captured by the imaging device 22. Therefore, the imaging device 22 corresponds to an object determination unit.

In the aforementioned embodiment, it is determined that the target in the collision prediction area has performed the near-collision avoidance behavior when the acceleration of the target has become more negative than the second negative threshold. In this regard, besides the acceleration of the target, the speed of the target may be used as one of criteria for the near-collision avoidance behavior determination, for example. Specifically, it may be determined that the target in the collision prediction area has performed the near-collision avoidance behavior when the acceleration of the target has become more negative than the second negative threshold and the speed of the target has become more negative than a third threshold which is set to be higher than the first threshold illustrated in FIG. 4(a). This makes it possible to determine with higher accuracy that the target has performed the near-collision avoidance behavior.

In the aforementioned embodiment, the lateral position of the collision prediction area is set based on the speed of the target and the time-to-collision. In this regard, besides the speed of the target and the time-to-collision, the acceleration of the target may be used. In this case, the lateral position of the collision prediction area is calculated by Equation (2). This makes it possible to set the collision prediction area in a more precise manner.

[Equation 1]
Lateral position=

$$\text{the speed of the target} \times TTC + \frac{\text{Acceleration of object} \times TTC^2}{2} \quad (2)$$

In the aforementioned embodiment, the target in the collision prediction area is determined as to whether it has made the near-collision avoidance behavior determination. When it is determined that the target has performed the near-collision avoidance behavior, the collision prediction area is reset to the area ahead of the own vehicle. In this regard, the near-collision avoidance behavior determination may not necessarily be made on the target in the collision prediction area. In this case, the collision prediction area is set based on the speed and acceleration of the target and the time-to-collision as expressed in Equation (2). When the target in the collision prediction area has performed the near-collision avoidance behavior from the normal state illustrated in FIG. 6(a) to the state illustrated in FIG. 6(a), the speed and acceleration of the target decrease significantly. Accordingly, the collision prediction area is reset to the direction where the target is not included. This makes it possible to prevent unnecessary activation of the warning device 31 or the braking device 32.

Figure 6:
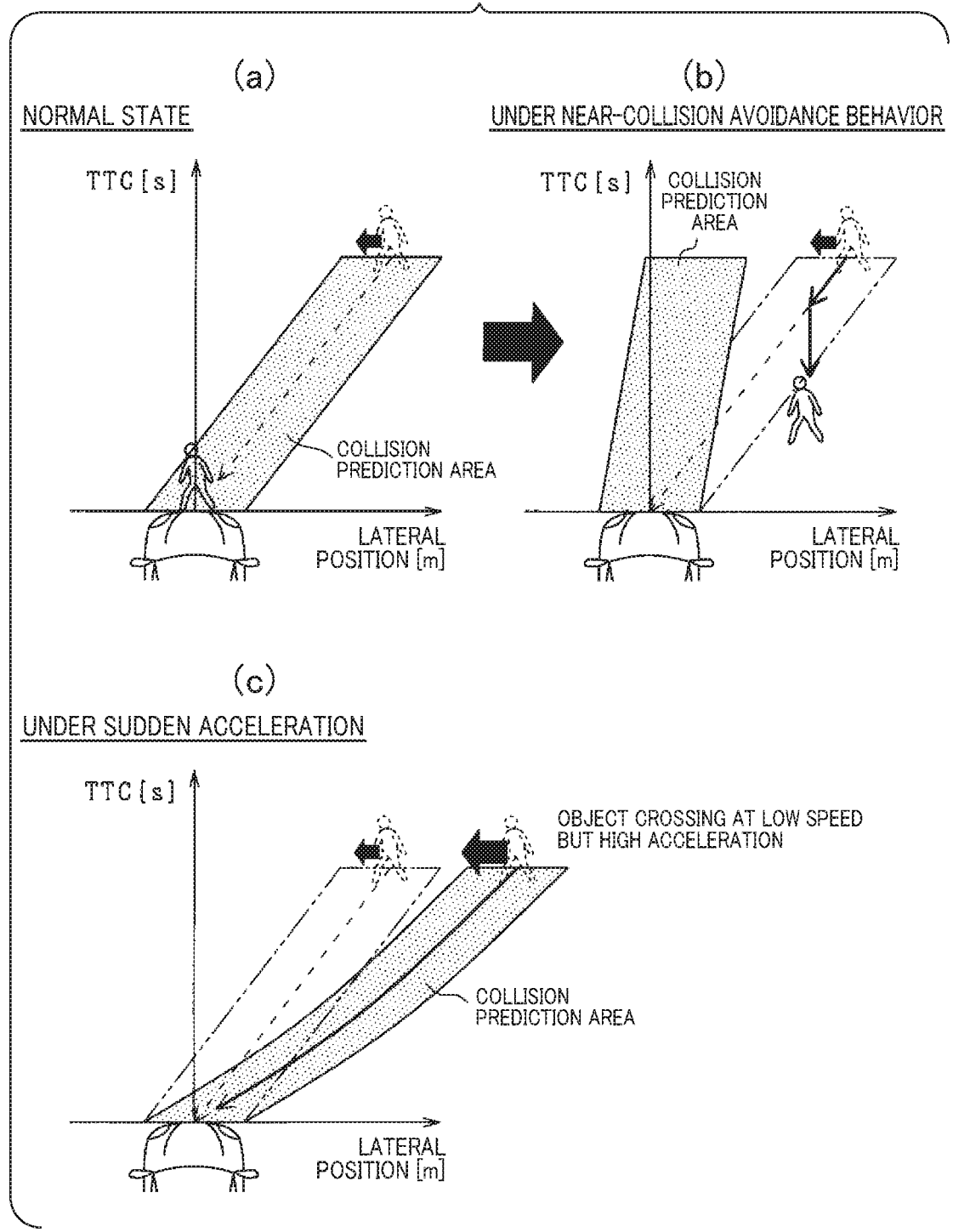
FIG. 6, in its (a), (b), and (c) parts, shows diagrams illustrating control performed by the driving support device according to other examples.

As illustrated in FIG. 6(c), even when the target is moving toward the own vehicle while performing a sudden acceleration in the direction crossing the traveling direction of the own vehicle, by resetting the collision prediction area based on the increased acceleration and speed of the target, the target can fall within the collision prediction area. In this manner, setting the collision prediction area according to Equation (2) makes it possible to predict a collision between the own vehicle and the target with higher accuracy and perform driving support under suitable situations.

The present disclosure has been described based on embodiments, however the present disclosure should not be construed as being limited to these embodiments and configurations. The scope of the present disclosure encompasses various modifications or equivalents. Further, various combinations or modes, or other combinations or modes constituted by one or more elements of the various combinations or modes are included within the category or idea of the present disclosure.

Partial Reference Signs List

10 . . . Detection ECU
21 . . . Radar device

The invention claimed is:

1. A driving support device mounted to a vehicle, characterized in that the device comprises:
an object detection unit that detects an object moving in a direction crossing a traveling direction of the vehicle;
a collision prediction unit that predicts a collision between the object detected by the object detection unit and the vehicle;
a support execution unit that, when the collision prediction unit predicts a collision between the object and the vehicle, performs driving support for reducing a risk of a collision of the vehicle;
an acceleration calculation unit that calculates an acceleration of the object; and
a prohibition unit that, when the acceleration calculated by the acceleration calculation unit has become more negative than a negative threshold, prohibits the support execution unit from performing the driving support related to the object,
wherein the negative threshold is set to be more negative than a minimum value of the acceleration, which is varying, based on a state where the object is moving in a steady state.

2. The driving support device according to claim 1, comprising an object determination unit that determines a type of the object, characterized in that the prohibition unit sets the negative threshold depending on the type of the object determined by the object determination unit.

3. The driving support device according to claim 1, comprising:
a speed calculation unit that calculates a speed of the object; and
a time-to-collision calculation unit that calculates a time-to-collision as a predicted time until an occurrence of a collision between the object and the vehicle based on information about the object detected by the object detection unit wherein
the collision prediction unit establishes a collision prediction area in a plane defined by a lateral position axis that indicates a position with respect to the vehicle in a lateral direction orthogonal to the traveling direction of the vehicle and a predicted time axis that indicates the time-to-collision set in the traveling direction of the vehicle, and predicts a collision with the object depending on whether the object is present in the collision prediction area in the plane,
a width of the collision prediction area along the lateral position axis is set based on a width of the vehicle, and
a lateral position of the collision prediction area along the lateral position axis is set based on the speed of the object calculated by the speed calculation unit and the time-to-collision calculated by the time-to-collision calculation unit.

4. The driving support device according to claim 1, comprising:
a speed calculation unit that calculates a speed of the object; and
a time-to-collision calculation unit that calculates a time-to-collision as a predicted time until an occurrence of a collision between the object and the vehicle based on information about the object detected by the object detection unit, wherein
the collision prediction unit establishes a collision prediction area in a plane defined by a lateral position axis that indicates a position with respect to the vehicle in a lateral direction orthogonal to the traveling direction of the vehicle and a predicted time axis that indicates the time-to-collision set in the traveling direction of the vehicle, and predicts a collision with the object depending on whether the object is present in the collision prediction area in the plane,
a width of the collision prediction area along the lateral position axis is set based on a width of the vehicle, and
a lateral position of the collision prediction area along the lateral position axis is set based on the speed of the object calculated by the speed calculation unit and the time-to-collision calculated by the time-to-collision calculation unit.

5. The driving support device according to claim 1, the vehicle includes a notification unit that notifies a driver of an approach of the object.

6. A driving support device mounted to a vehicle, comprising:
an object detection unit that detects an object moving in a direction crossing a traveling direction of the vehicle;
a collision prediction unit that predicts a collision between the object detected by the object detection unit and the vehicle;
a support execution unit that, when the collision prediction unit predicts a collision between the object and the vehicle, performs driving support for reducing a risk of a collision of the vehicle;
a speed calculation unit that calculates a speed of the object;
an acceleration calculation unit that calculates an acceleration of the object; and
a time-to-collision calculation unit that calculates a time-to-collision as a predicted time until an occurrence of a collision between the object and the vehicle based on information about the object detected by the object detection unit,
wherein
the collision prediction unit establishes a collision prediction area in a plane defined by a lateral position axis that indicates a position with respect to the vehicle in a lateral direction orthogonal to the traveling direction of the vehicle and a predicted time axis that indicates the time-to-collision set in the traveling direction of the vehicle, and predicts a collision with the object depending on whether the object is present in the collision prediction area in the plane,
a width of the collision prediction area along the lateral position axis is set based on a width of the vehicle, and
a lateral position of the collision prediction area along the lateral position axis is set based on the speed of the object calculated by the speed calculation unit, the acceleration of the object calculated by the acceleration calculation unit, and the time-to-collision calculated by the time- to-collision calculation unit.

7. The driving support device according to claim 6, the vehicle includes a notification unit that notifies a driver of an approach of the object.

8. The driving support device according to claim 7, wherein:
the vehicle includes an automatic braking unit that applies an automatic braking to the vehicle; and after a notification by the notification unit, the support execution unit causes the automatic braking unit to apply the automatic braking when a probability of a collision between the object and the vehicle predicted by the collision prediction unit has become higher than before the notification given by the notification unit.

9. The driving support device according to claim 6, the vehicle includes a notification unit that notifies a driver of an approach of the object.

10. A driving support method executed by a driving support system mounted to a vehicle, comprising:
an object detection step of detecting an object moving in a direction crossing a traveling direction of the vehicle;
a collision prediction step of predicting a collision between the object detected in the object detection step and the vehicle;
a support execution step of performing driving support for reducing a risk of a collision of the vehicle when a collision between the object and the vehicle is predicted in the collision prediction step;
an acceleration calculation step of calculating an acceleration of the object; and
a prohibition step of prohibiting execution of the driving support to the object in the support execution step when the acceleration calculated in the acceleration calculation step has become more negative than a negative threshold,
wherein the negative threshold is set to be more negative than a minimum value of the acceleration, which is varying, based on a state where the object is moving in a steady state.

11. The driving support method according to claim 10, comprising:
a speed calculation step of calculating a speed of the object; and
a time-to-collision calculation step of calculating a time-to-collision as a predicted time until an occurrence of a collision between the object and the vehicle based on information about the object detected in the object detection step, characterized in that:
in the collision prediction step, a collision prediction area is established in a plane defined by a lateral position axis that indicates a position with respect to the vehicle in a lateral direction orthogonal to the traveling direction of the vehicle and a predicted time axis that indicates the time-to-collision set in the traveling direction of the vehicle, and a collision with the object is predicted depending on whether the object is present in the collision prediction area in the plane,
a width of the collision prediction area along the lateral position axis is set based on a width of the vehicle, and
a lateral position of the collision prediction area along the lateral position axis is set based on the speed of the object calculated in the speed calculation step and the time-to-collision calculated in the time-to-collision calculation step.

12. A driving support device mounted to a vehicle, characterized in that the device comprises:
an object detection unit that detects an object moving in a direction crossing a traveling direction of the vehicle;
a collision prediction unit that predicts a collision between the object detected by the object detection unit and the vehicle;
a support execution unit that, when the collision prediction unit predicts a collision between the object and the vehicle, performs driving support for reducing a risk of a collision of the vehicle;
an acceleration calculation unit that calculates an acceleration of the object;
a prohibition unit that, when the acceleration calculated by the acceleration calculation unit has become more negative than a negative threshold, prohibits the support execution unit from performing the driving support related to the object;
a speed calculation unit that calculates a speed of the object; and
a time-to-collision calculation unit that calculates a time-to-collision as a predicted time until an occurrence of a collision between the object and the vehicle based on information about the object detected by the object detection unit,
wherein
the collision prediction unit establishes a collision prediction area in a plane defined by a lateral position axis that indicates a position with respect to the vehicle in a lateral direction orthogonal to the traveling direction of the vehicle and a predicted time axis that indicates the time-to-collision set in the traveling direction of the vehicle, and predicts a collision with the object depending on whether the object is present in the collision prediction area in the plane, a width of the collision prediction area along the lateral position axis is set based on a width of the vehicle, and a lateral position of the collision prediction area along the lateral position axis is set based on the speed of the object calculated by the speed calculation unit and the time-to-collision calculated by the time-to-collision calculation unit.

13. The driving support device according to claim 12, wherein the lateral position of the collision prediction area is corrected based on an acceleration of the object in the lateral direction.

14. The driving support device according to claim 13, wherein the prohibition unit sets the collision prediction area in the plane so as to be located in an area ahead of the vehicle, based on only a width of the vehicle to prohibit the driving support from being performed to the object.

15. The driving support device according to claim 12, wherein the prohibition unit sets the collision prediction area in the plane so as to be located in an area ahead of the vehicle, based on only a width of the vehicle to prohibit the driving support from being performed to the object.

* * * * *